(12) United States Patent
Jan

(10) Patent No.: US 6,399,240 B1
(45) Date of Patent: Jun. 4, 2002

(54) STACK BATTERY STRUCTURE

(75) Inventor: Yih-Song Jan, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/535,465

(22) Filed: Mar. 23, 2000

(51) Int. Cl.$^7$ ............................ H01M 2/16; H01M 2/18
(52) U.S. Cl. ........................................ 429/137; 429/144
(58) Field of Search ........................ 429/144, 137, 429/217, 215, 216, 232, 250

(56) References Cited

U.S. PATENT DOCUMENTS

| | | | | |
|---|---|---|---|---|
| 4,298,666 A | * | 11/1981 | Taskier | 429/206 |
| 4,883,457 A | * | 11/1989 | Sibalis | 604/20 |
| 5,409,786 A | * | 4/1995 | Bailey | 429/52 |
| 5,565,284 A | * | 10/1996 | Koga et al. | 429/218 |
| 5,631,100 A | * | 5/1997 | Yoshino et al. | 429/62 |
| 5,766,789 A | * | 6/1998 | James et al. | 429/44 |
| 5,856,042 A | * | 1/1999 | Bailey | 429/209 |
| 5,952,123 A | * | 9/1999 | Hatanaka et al. | 429/217 |
| 6,063,142 A | * | 5/2000 | Kawakami et al. | 29/623.5 |
| 6,171,723 B1 | * | 1/2001 | Loch et al. | 429/217 |

* cited by examiner

*Primary Examiner*—Tom Dunn
*Assistant Examiner*—Zidia Pittman
(74) *Attorney, Agent, or Firm*—W. Wayne Liauh

(57) ABSTRACT

The present invention relates to a stack battery structure, which possesses a high energy density and can avoid the existence of a die volume. Through the means of separating binder and active materials and of rearranging the position of binder, the positive/negative electrode thus fabricated can be glued with a polymeric separator membrane via the binder in the stacking and pressuring process without affecting the percentage of active materials in each unit of weight. This stack battery structure obviates the problem of a die volume caused by rolling the cell electrode into a spiral in the prior art. It also increases the energy density of the battery.

14 Claims, 13 Drawing Sheets

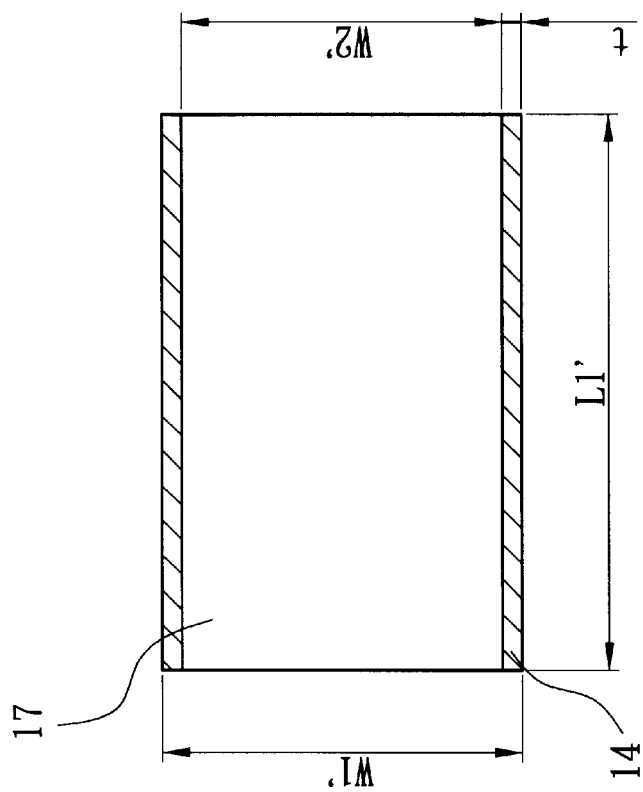
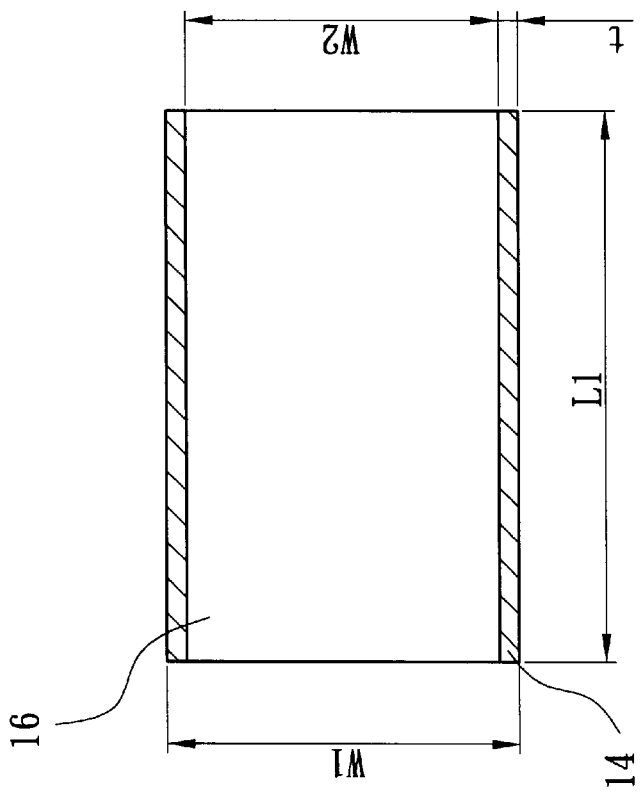
FIG. 17
FIG. 18

STACK BATTERY STRUCTURE

BACKGROUND OF THE INVENTION

1. Field of the Invention

The instant invention relates to a stack battery structure. In particular, the invention relates to a battery structure that possesses a high energy density and avoids the existence of a die volume by stacking battery cell electrodes.

2. Related Art

For an ordinary rechargeable battery, the positive/negative electrode 10a, 10b coating and assembly methods are first done by mixing positive/negative-pole active substances, polymeric binder, and a conducting agent into a positive/negative-pole active material 12a, 12b to be coated onto a current collector 11a, 11b using a coating machine. The coating pattern is shown in FIG. 1 or FIG. 2.

FIG. 1 shows a coating of a single material at intervals, while FIG. 2 shows a continuous coating of a single material. The coated positive/negative electrode 10a, 10b is further put under pressure and striped. Polymeric separator membranes are employed to separate them. Afterwards, the structure is rolled into a circle or an ellipse for making a cylindrical or prismatic battery.

Since recent developments in electronics are toward thinner, lighter, and smaller equipment, the design of a rechargeable secondary battery then has stricter requirements on the weight, energy density, and space of the battery. The early secondary battery structure has a circular shape, as shown in FIG. 3. The positive electrode/polymeric separator membrane/negative electrode module is rolled into a spiral 20 and put into a cylindrical metal case 21. Technically, this spiral structure is relatively mature. But it obviously can not prevent the existence of a die volume 22 and results in spatial waste.

Therefore, batteries with rectangular cases are then invented, as shown in FIG. 4. Currently, prismatic batteries are widely used in the design of lithium ion batteries and nickel hydrogen batteries. There is less spatial waste using a rectangular case for battery cell stacking. Yet, if the positive/negative electrode is rolled into an elliptical spiral and then put into a rectangular metal case 21a, there is still some die volume 22a within the battery.

In view of the foregoing, recent battery assembly is performed by stacking and pressuring, which is similar to the stacking in polymeric batteries, as shown in FIG. 5. In principle, the battery formed by stacking electrodes 30 can reach the closest stacking; namely, the space is more effectively used. With the encapsulation of an aluminum foil case 31, the total weight of the battery can be lowered. So this could increase the energy density of the battery. Nonetheless, the electrodes and polymeric separator membranes (PE, PP, or non-woven cloth) are not adhesive to each other in current battery designs, so current rechargeable batteries (nickel hydrogen battery, lithium ion battery) can not be fabricated by stacking and pressuring. The polymeric battery can be manufactured by stacking and pressuring because the polymeric electrolytic membranes (similar to separator membranes) bear a stronger adhesivity. Yet since the electrodes need to be stacked and pressured with the polymeric electrolytic material (membranes), the polymeric binder on the positive/negative electrode need to be increased, which unfortunately lowers the ratio of active material on the electrodes. Thus, the polymeric battery has a lower energy density than the lithium ion battery does. Moreover, the increase of polymeric binder on the electrodes lowers the electrical conductivity on the electrodes, resulting in difficult charge/discharge processes in large polymeric batteries.

Therefore, how to perform the closest packing on the positive/negative electrodes and the polymeric separator membranes without increasing the amount of polymeric binder on the electrodes becomes the most urgent issue nowadays.

SUMMARY OF THE INVENTION

It is an object of the present invention to provide a stack battery structure that can avoid a die volume due to spiraling of conventional battery cell electrodes and also increase the energy density of the battery.

The present invention uses stacking to prevent the formation of the die volume when electrodes are spiraled into a circular or elliptical shape.

Furthermore, to increase the energy density of the battery, the stack battery disclosed in the present invention is characterized in that (a) the binder is separated from the active material; (b) by rearranging the positions of the binder, the positive/negative electrode can be glued with the polymeric separator membranes via the binder in the process of stacking and pressuring; and (c) the percentage of the active material in each unit of weight is not affected and the binding action due to stacking and pressuring has nothing to do with the active material.

In a preferred embodiment of the invention, the binder layer is formed on a single surface of the current collector on the battery electrode by die coating or screen printing.

In another preferred embodiment of the invention, the binder layer is formed on both surfaces of the current collector on the battery electrode by die coating or screen printing.

In yet another preferred embodiment of the invention, the binder layer is formed on the peripheral of the electrode material, on the two symmetric side edges, or distributed along the diagonals on the surface of the electrode so that the positive/negative electrode can be tightly bound to the polymeric separator membranes.

The stack battery structure disclosed in the invention achieves the following effects:
1. A binder layer is formed on the current collector surfaces of the battery electrodes for binding with the positive/negative electrode and the polymeric separator membrane. Therefore, the binding of stacking and pressuring has nothing to do with the active material and accordingly there are much more choices for the materials of the binder layer and the polymeric separator membrane.
2. The present invention can be applied to lithium ion batteries, lithium polymeric batteries, nickel hydrogen batteries, and capacitors.
3. The energy density of the battery can be increased by stacking battery electrodes.
4. The problem of the die volume caused by spiraling electrodes can be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIG. 17 is a schematic view of the size of the positive electrode according to the third embodiment of the invention;

FIG. 18 is a schematic view of the size of the negative electrode according to the third embodiment of the invention.

DETAILED DESCRIPTION OF THE INVENTION

Figure 2:
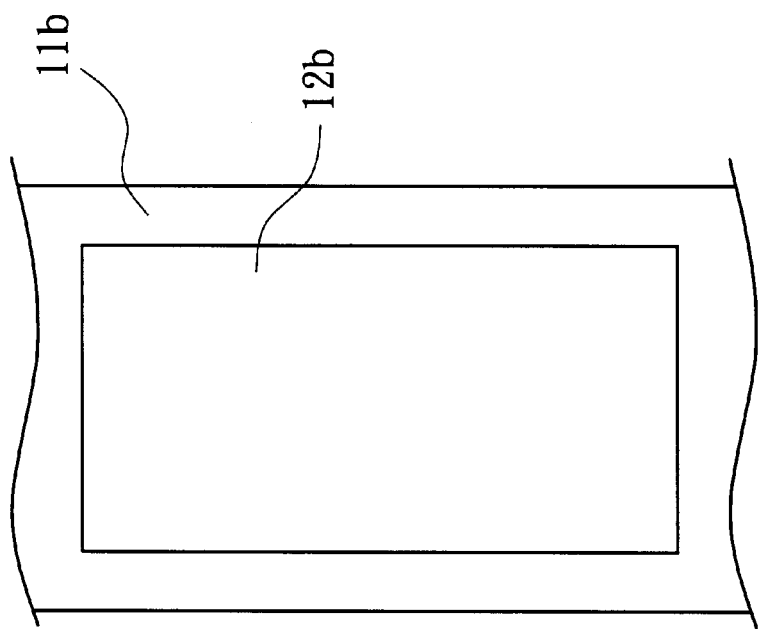
FIG. 2 is a schematic view of another conventional coating.
Figure 1:
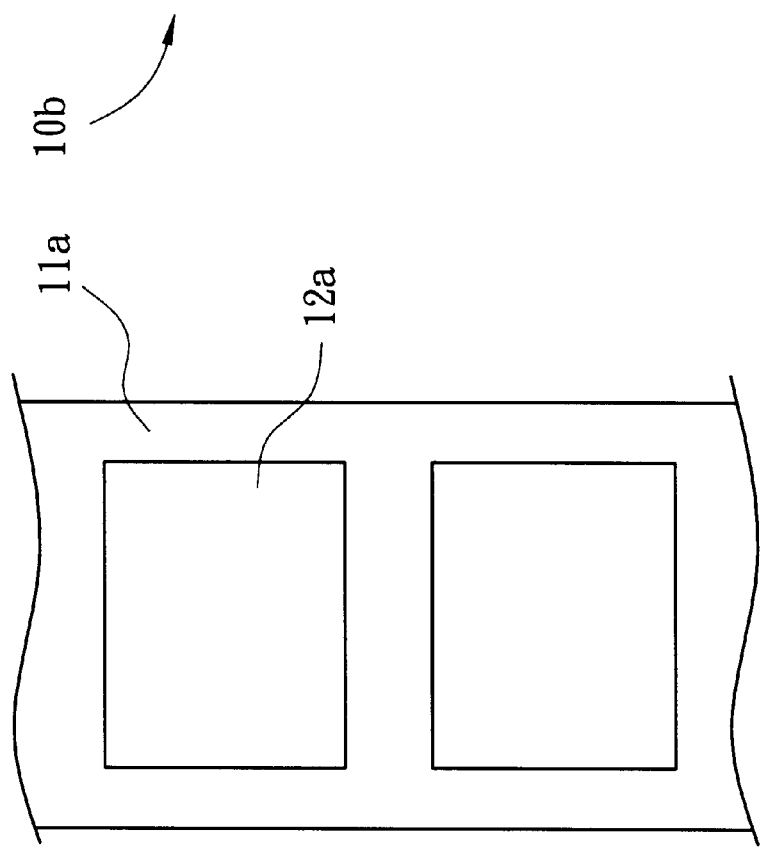
FIG. 1 is a schematic view of a conventional coating.
Figures 3, 4:
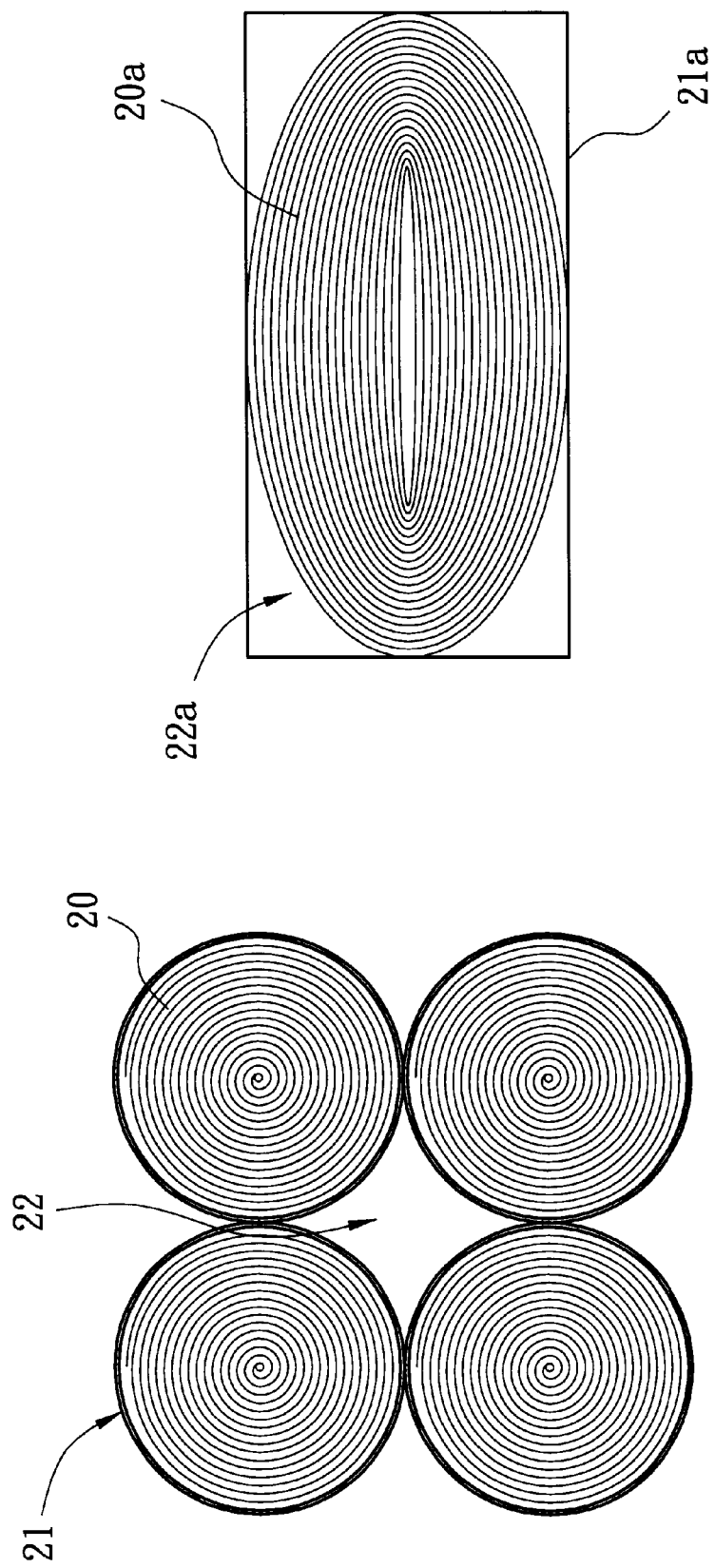
FIG. 3 is a schematic structure of the conventional cylindrical battery.
FIG. 4 is a schematic structure of the conventional rectangular battery.
Figure 5:
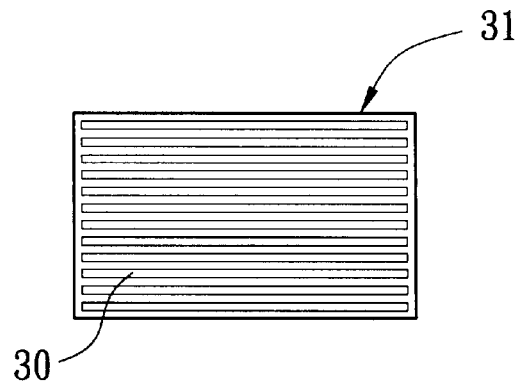
FIG. 5 is a schematic view of the stack battery formed by stacking and pressure treatments.
Figure 6A:
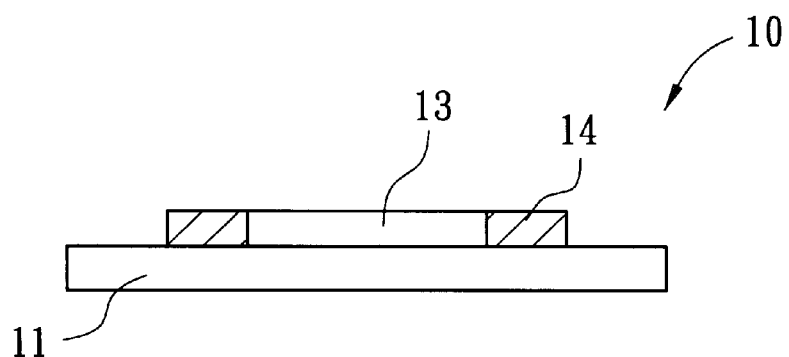
FIGS. 6A to 6B show cross sectional views of the electrodes of a stack battery according to the present invention.
Figure 6B:
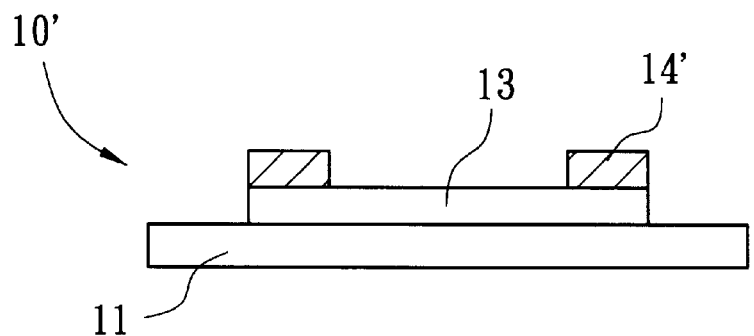

Please refer to FIGS. 6A, 6B, which show cross sectional views of the electrodes 10, 10' of a stack battery according to the present invention. The main technical means featured in the present invention is to coat an active material on any surface of the current collector 11 to form an electrode layer 13. Any or a plurality of edge surfaces of neighboring electrode layers of the opposite positive/negative electrodes 10, 10' is applied with a binder layer 14. Alternatively, the binder layer 14' can be applied along the rim of the top surface of the electrode layer 13. By the adhesivity of the binder and the heat and pressure, the positive/negative electrode 10 can bind with almost any polymeric separator membrane (not shown). In principle, the closest packing can be thus obtained without the need to change the composition of the active material on the battery electrode 10.

Figure 7:
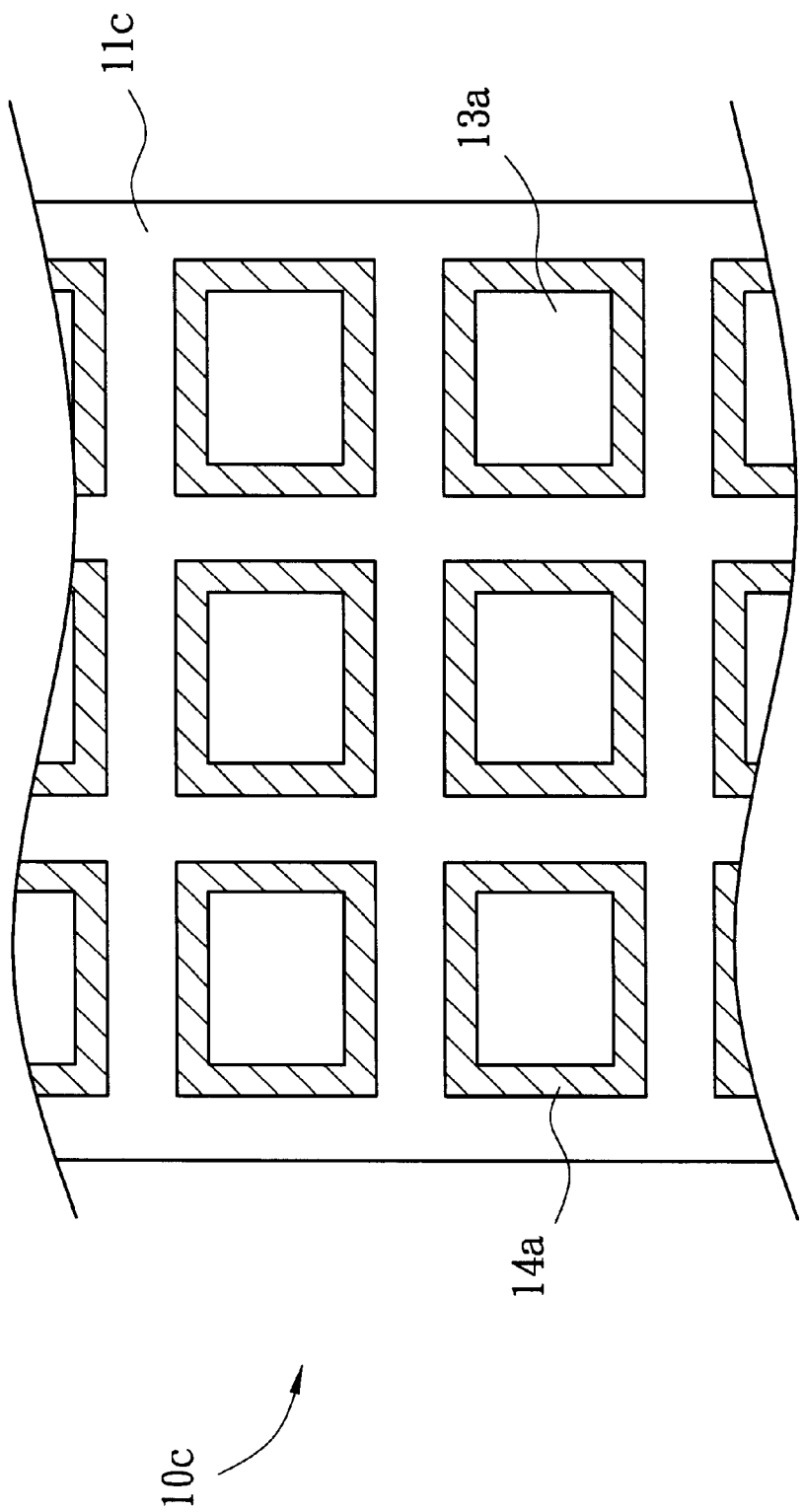
FIG. 7 is a schematic view of first coating pattern according to the present invention.

The machining employed in the invention comprises (1) die coating and (2) screen printing. The battery of the invention is thus characterized by die coating or screen printing binder on the electrodes 10 for easy binding with polymeric separator membranes. The possible coating patterns include:

Method 1: The electrode active material and the binder layer 14a are applied onto a single or both surfaces of the current collector 11c by die coating or screen printing, as shown in FIG. 7. The electrode material is distributed in blocks to form the electrode layer 13a, and the binder layer 14a is applied along a single or multiple sides of the electrode layer 13a. For example, the binder layer 14a is coated along the rim of the electrode layer 13a. The block with positive/negative electrode layer 13a and the binder layer 14a is cut off by impingement and is then bound into the module of a positive electrode, a negative electrode and a polymeric separator membrane in between under heat and pressure. The polymeric separator membrane includes PP, PE, PP/PE compound layer, and non-woven cloth. Due to the special structure of the electrode 10c, the binding ability between the electrode 10c and the polymeric separator membrane is determined solely by the binding force between the binder layer 14a and the polymeric separator membrane, but has nothing to do with the electrode binder. Thus, there are many choices for the binder layer 14a and the polymeric separator membrane. For example, the material of the binder layer 14a can be rubber binder, sulfide compound, epoxy, polyester, ethylene-acetate polyvinyl, ethylene-acrylic polyester, polyethylene (PE), polypropylene (PP), styrene-isoproprene or styrene-butadiene copolymers acryl binder, cyanide acetate ester binder, aromatic polyamine binder, silicone binder, polyhenzimidazoles polyquinoxalines polyphenyl quinoxalines, and polyquinoline, etc.

Figure 8:
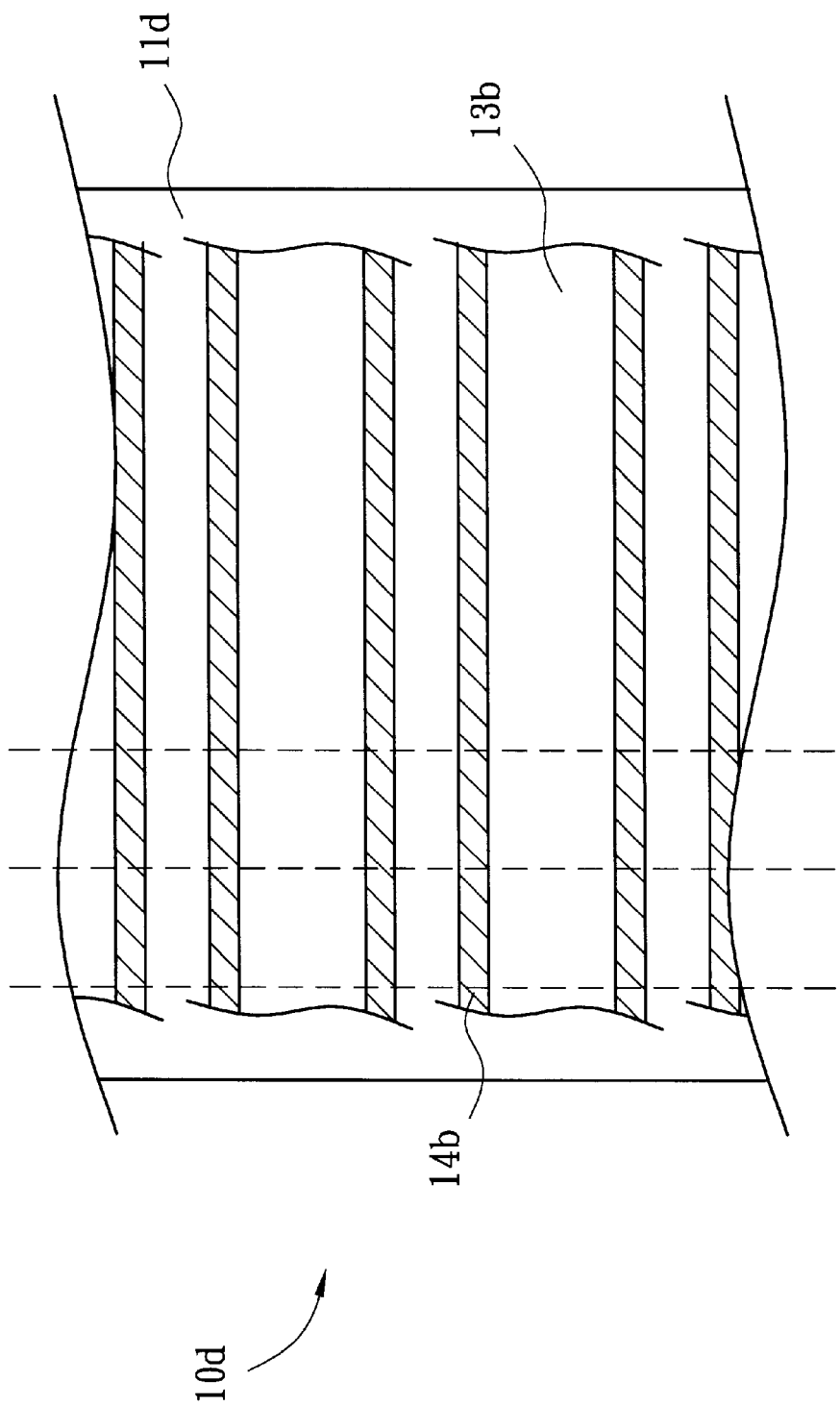
FIG. 8 is a schematic view of second coating pattern according to the present invention.

Method 2: The electrode 10d as shown in FIG. 8 is made by die coating or screen printing the electrode active material and the binder layer 14b on a single or both surfaces of the current collector 11d. The electrode layer 13b formed by the electrode material and the binder layer 14b are coated crossways. It is then cut or striped into sheets of positive/negative electrodes 10d so that the binder layer 14b is disposed symmetrically on both sides of the electrode layer 13b. The positive electrode, polymeric separator membrane, and negative electrode are bound together under heat and pressure to form a rechargeable battery cell.

Figure 9:
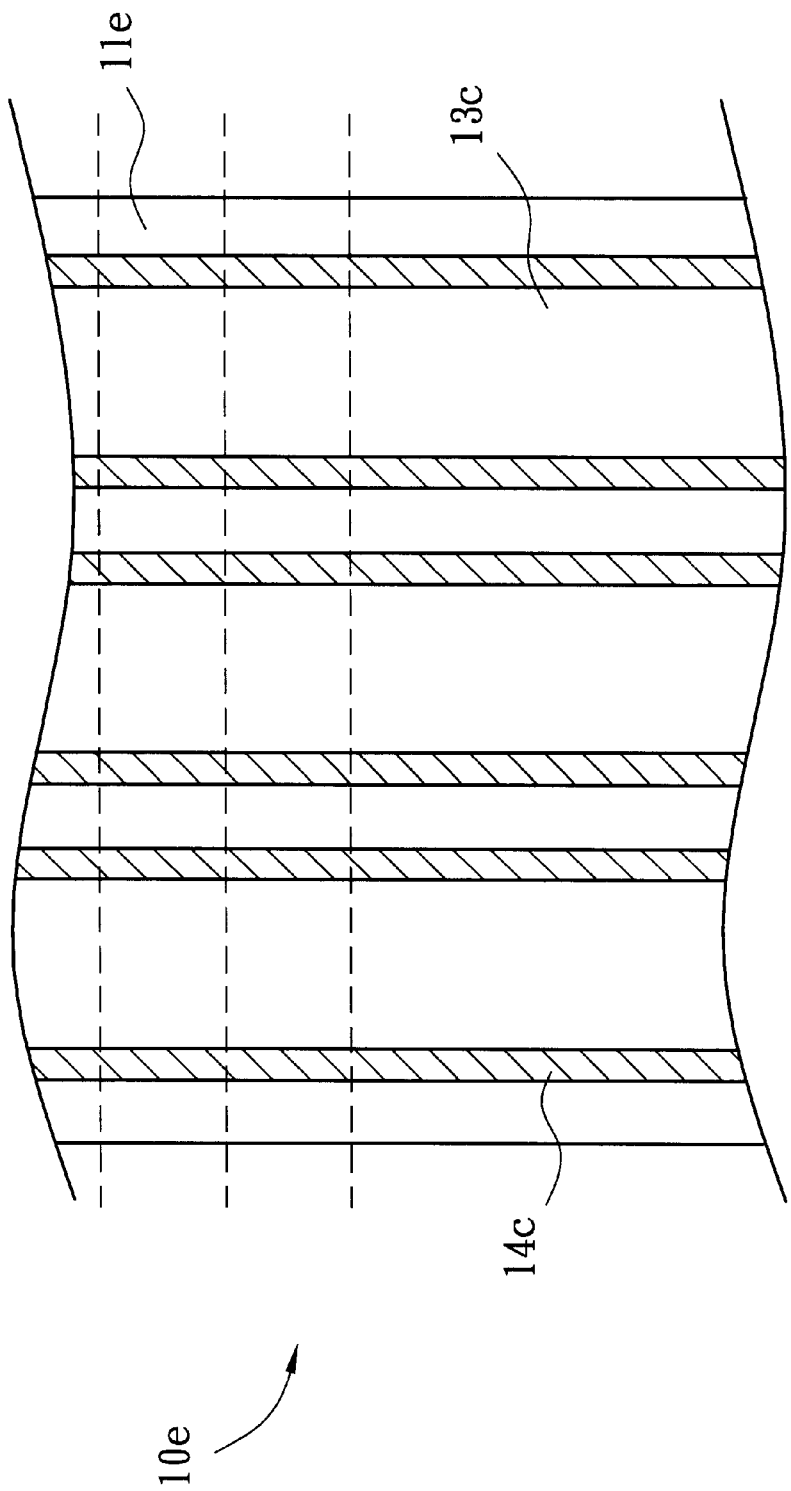
FIG. 9 is a schematic view of third coating pattern according to the present invention.

Method 3: The electrode 10e as shown in FIG. 9 is made by die coating or screen printing the electrode active material and the binder layer 14c on a single or both surfaces of the current collector 11e. The electrode layer 13c formed by the electrode material and the binder layer 14c are coated crossways so that the binder layer 14c is disposed symmetrically on both sides of the electrode layer 13c. It is then cut or striped into sheets or stripes of positive/negative electrodes 10e. The positive electrode, polymeric separator membrane, and negative electrode are bound together under heat and pressure to form a rechargeable battery cell.

Figure 10:
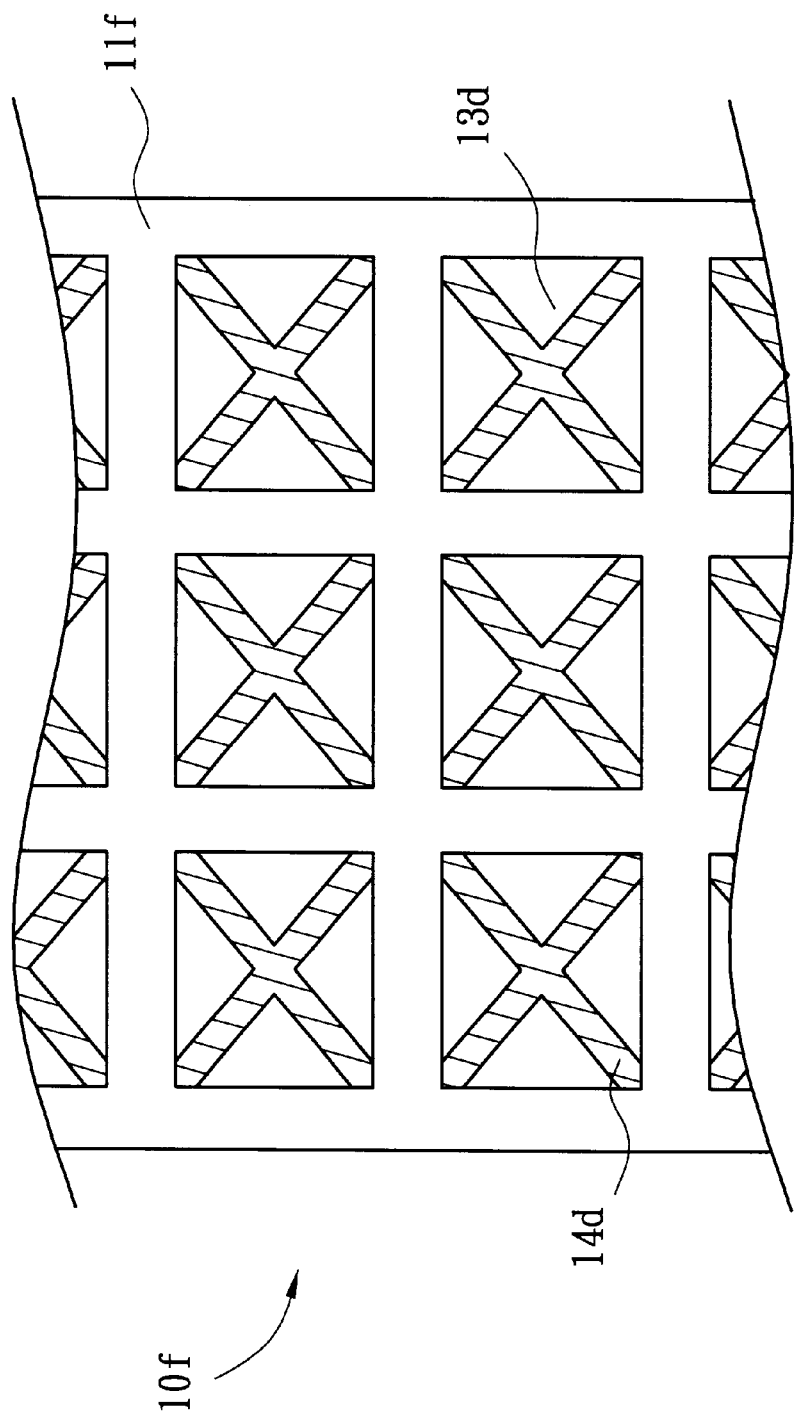
FIG. 10 is a schematic view of fourth coating pattern according to the present invention.

Method 4: The electrode 10f as shown in FIG. 10 is made by die coating or screen printing the electrode active material and the binder layer 14d on a single or both surfaces of the current collector 11f. The binder layer 14d is distributed along the surface diagonals of the electrode layer 13d formed by the electrode material. The positive/negative electrode 10f is cut off by impinging or cutting. The positive electrode, polymeric separator membrane, and negative electrode are bound together under heat and pressure to form a rechargeable battery cell.

The stack battery structure obtained using the above four methods can be applied to lithium ion batteries, lithium polymeric batteries, nickel hydrogen batteries and capacitors.

The coating on the positive electrode is performed by mixing 85% of $LiCoO_2$, 10% of the conducting agent ks6, and 5% of PVdF binder and dissolving the mixture into a serum with NMP as the solvent. The binder is composed of PE or epoxy dissolved in NMP, which can be made into the serum for coating. The positive electrode material and the binder are simultaneously or step-by-step coated by die coating or screen printing according to the methods 1, 2 and 3 as shown above.

The coating on the positive electrode is performed by mixing 90% of MCMB powders, 10% of PVdF binder and dissolving the mixture into a serum with NMP as the solvent. The binder is composed of PE or epoxy dissolved in NMP, which can be made into the serum for coating. The negative electrode material and the binder are simultaneously or step-by-step coated by injection molded die coating or screen printing according to the methods 1, 2 and 3 as shown above.

Figure 11:
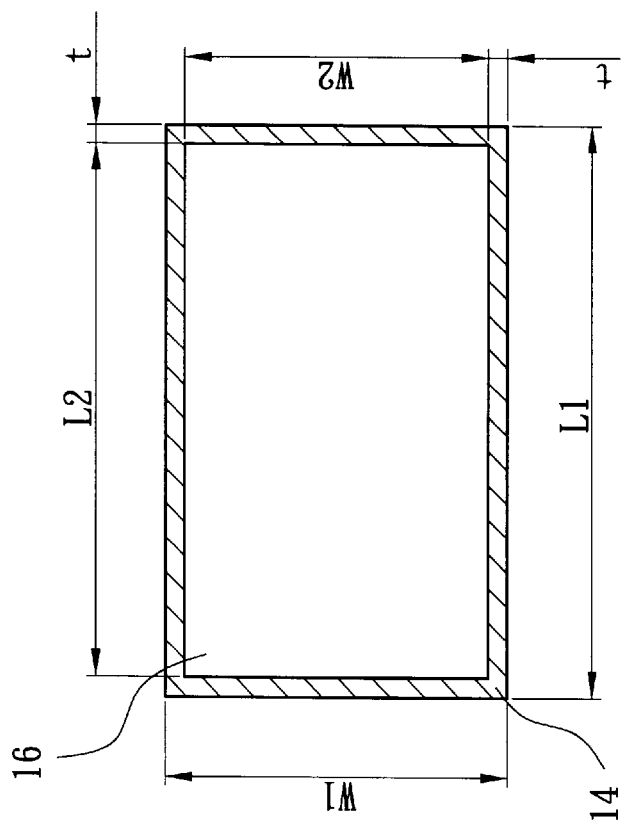
FIG. 11 is a schematic view of the size of the positive electrode according to the first embodiment of the invention.

Embodiment 1: The positive electrode formed by Method 1 is cut into electrodes with the binder layer 14 and the dimension (W1*L1) of (4.0+0.5)cm*(7.0+0.5)cm by pressure molding or cutting, wherein the dimension (W2*L2) of the positive electrode 16 is 4.0 cm*7.0 cm and the rest area with a width of t=0.25 cm is coated with the binder layer 14 (FIG. 11).

Figure 12:
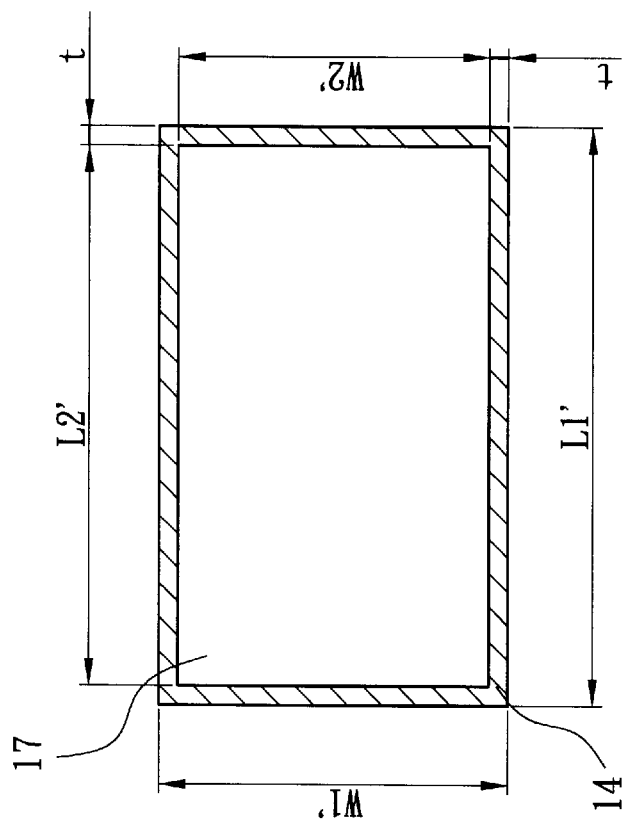
FIG. 12 is a schematic view of the size of the negative electrode according to the first embodiment of the invention.

The negative electrode formed by Method 1 is cut into electrodes with the binder layer 14 and the dimension (W1'*L1') of (4.1+0.5)cm*(7.1+0.5)cm by pressure molding or cutting, wherein the dimension (W2'*L2') of the negative electrode 17 is 4.1 cm*7.1 cm and the rest area with a width of t=0.25 cm is coated with the binder layer 14 (FIG. 12).

Figure 13:
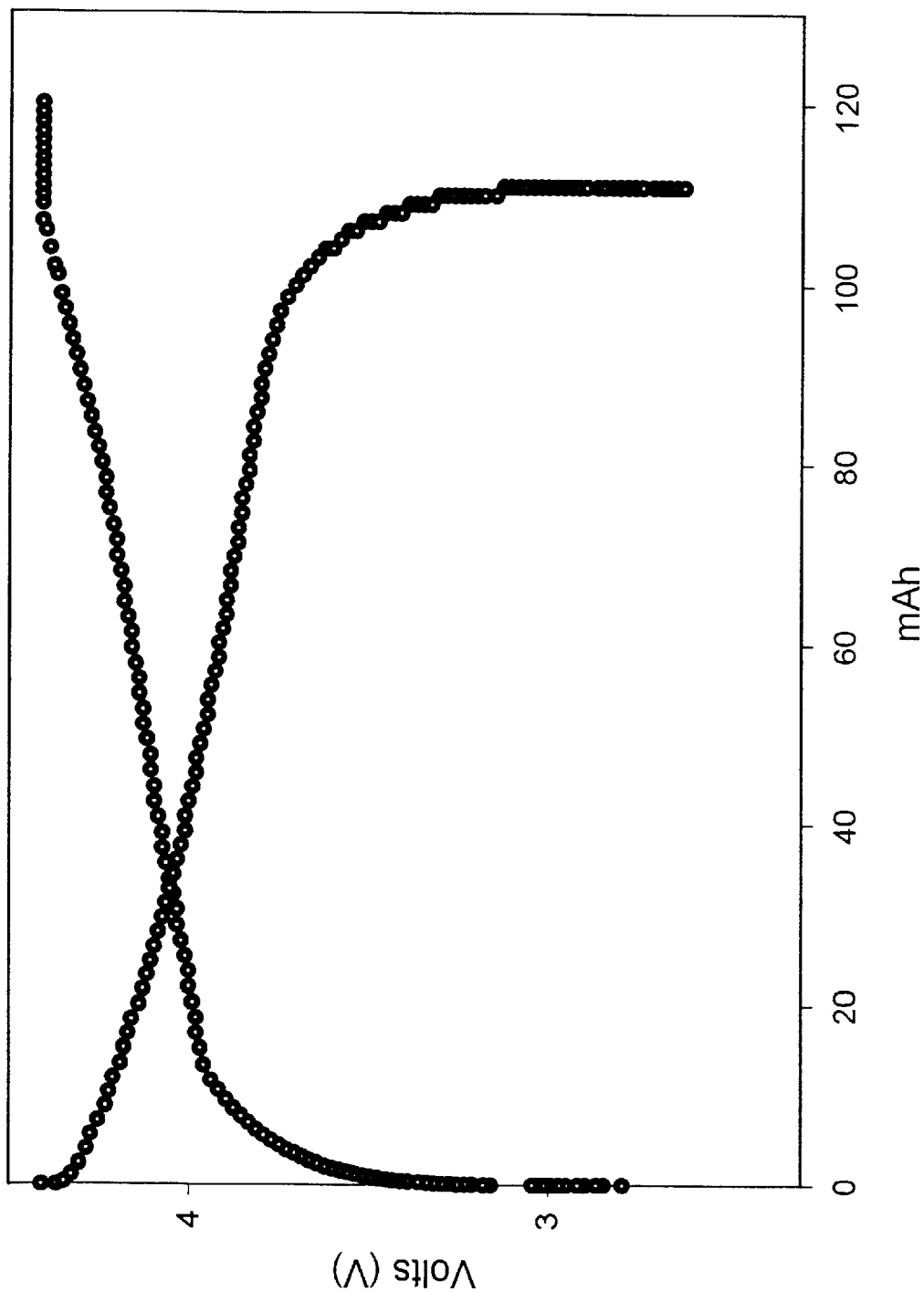
FIG. 13 is the charge/discharge diagram of the first embodiment of the invention.

The above positive and negative electrodes and a PE separator membrane with a dimension 4.7 cm*7.7 cm are under heat and pressure with a temperature of 140° C. for 5 minutes. After soldering the conducting plates and placing the module into an aluminum foil bag or metal case, the MEX2 electrolyte is filled by vacuum perfusion. The battery with the signal layer structure is completed after encapsulation of the aluminum foil bag. The charge/discharge diagram is shown in FIG. 13.

Figure 14:
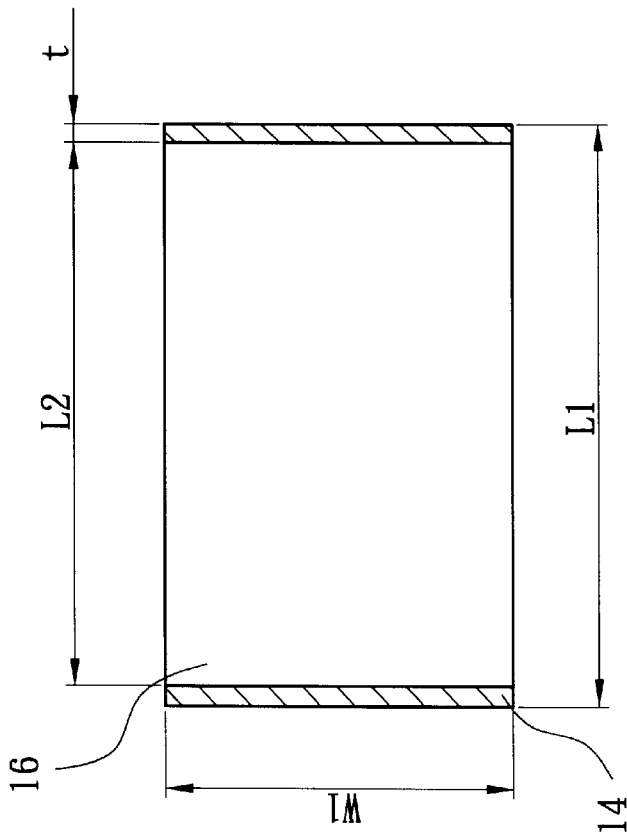
FIG. 14 is a schematic view of the size of the positive electrode according to the second embodiment of the invention.

Embodiment 2: The positive electrode formed by Method 2 is cut into electrodes with the binder layer 14 and the dimension (W1*L1) of (4.0+0.5)cm*(7.0+0.5)cm by pressure molding or cutting, wherein the dimension (W1*L2) of the positive electrode 16 is 4.0 cm*7.0 cm and the rest area with a width of t=0.25 cm is coated with the binder layer 14 (FIG. 14).

Figure 15:
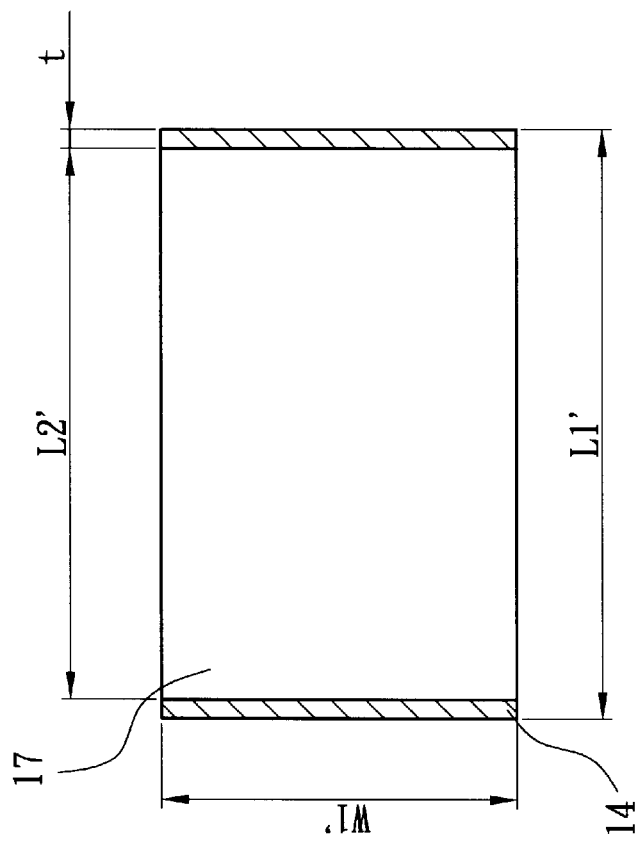
FIG. 15 is a schematic view of the size of the negative electrode according to the second embodiment of the invention.

The negative electrode formed by Method 2 is cut into electrodes with the binder layer 14 and the dimension (W1'*L1') of (4.1+0.5)cm*(7.1+0.5)cm by pressure molding or cutting, wherein the dimension (W1'*L2') of the negative electrode 17 is 4.1 cm*7.1 cm and the rest area with a width of t=0.25 cm is coated with the binder layer 14 (FIG. 15).

Figure 16:
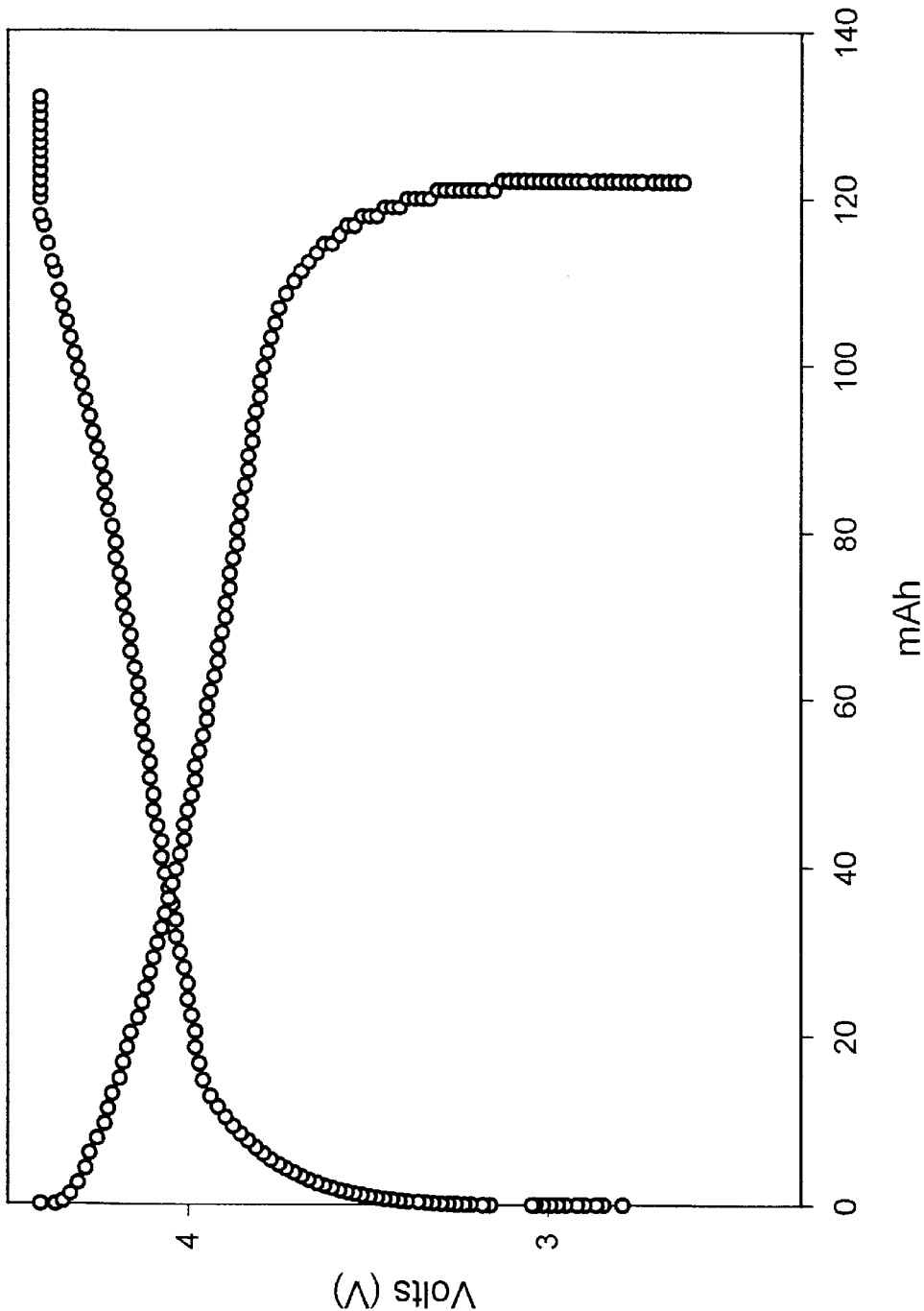
FIG. 16 is the charge/discharge diagram of the second embodiment of the invention.

The above positive and negative electrodes and a PE separator membrane with a dimension 4.7 cm*7.7 cm are under heat and pressure with a temperature of 140° C. for 5 minutes. After soldering the conducting plates and placing the module into an aluminum foil bag or metal case, the MEX2 electrolyte is filled by vacuum perfusion. The battery with the signal layer structure is completed after encapsulation of the aluminum foil bag. The charge/discharge diagram is shown in FIG. 16.

Embodiment 3: The positive electrode formed by Method 3 is cut into electrodes with the binder layer 14 and the dimension (W1*L1) of (4.0+0.5)cm*(7.0+0.5)cm by pressure molding or cutting, wherein the dimension (W2*L1) of the positive electrode 16 is 4.0 cm*7.0 cm and the rest area with a width of t=0.25 cm is coated with the binder layer 14

The negative electrode formed by Method 3 is cut into electrodes with the binder layer 14 and the dimension (W1'*L1') of (4.1+0.5)cm*(7.1+0.5)cm by pressure molding or cutting, wherein the dimension (W2'*L1') of the negative electrode 17 is 4.1 cm*7.1 cm and the rest area with a width of t=0.25 cm is coated with the binder layer 14 (FIG. 18).

Figure 19:
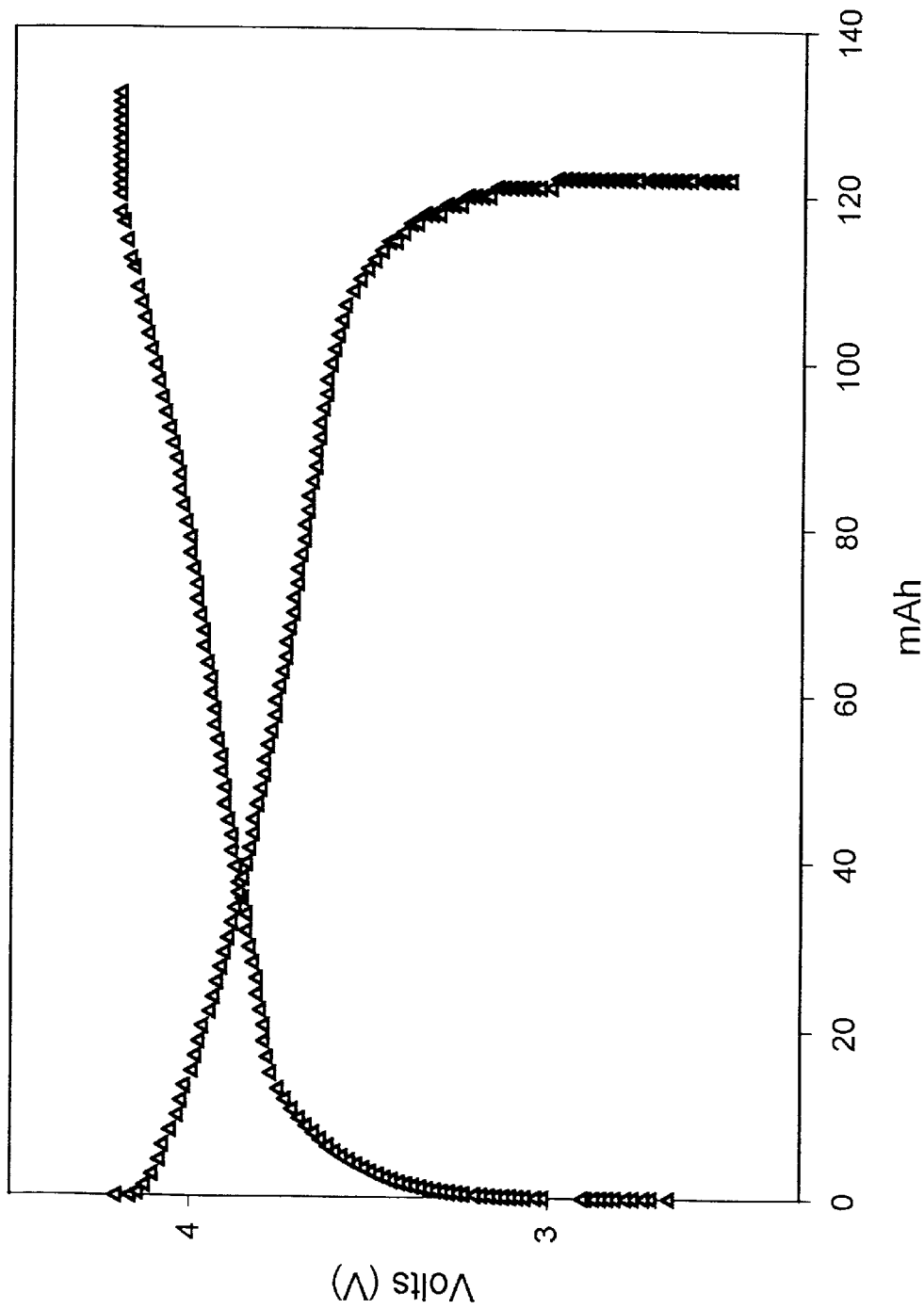
FIG. 19 is the charge/discharge diagram of the third embodiment of the invention.

The above positive and negative electrodes and a PE separator membrane with a dimension 4.7 cm*7.7 cm are under heat and pressure with a temperature of 140° C. for 5 minutes. After soldering the conducting plates and placing the module into an aluminum foil bag or metal case, the MEX2 electrolyte is filled by vacuum perfusion. The battery with the signal layer structure is completed after encapsulation of the aluminum foil bag. The charge/discharge diagram is shown in FIG. 19.

The battery structures shown in the above embodiments use a single battery cell (positive electrode/polymeric separator membrane/negative electrode) bound together by heating and pressuring, nevertheless, a plurality of battery cells (e.g., positive electrode/polymeric separator membrane/ negative electrode/polymeric separator membrane/ positive electrode) can be stacked together by pressuring to form a stack battery structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stack battery, comprising:

a positive electrode, a negative electrode, and a polymeric separator membrane, the polymeric separator membrane being interposed between the positive electrode and the negative electrode, and a plurality of the positive and negative electrodes being stacked into a battery cell, characterized in that:

any of the positive and negative electrodes contains a current collector, any of whose surfaces is coated with an electrode layer and part of the opposite surfaces of adjacent positive and negative electrodes is further coated with a binder layer for binding the positive and negative electrodes with the polymeric separator membrane;

and the binder layer is coated on the edge of the electrode layer.

2. The battery of claim 1, wherein the binder layer is coated on the surface of the electrode layer.

3. The battery of claim 1, wherein the binder layer is coated on the edge of the electrode layer.

4. A stack battery, comprising:

a positive electrode, a negative electrode, and a polymeric separator membrane, the polymeric separator membrane being interposed between the positive electrode and the negative electrode, and a plurality of the positive and negative electrodes being stacked into a battery cell, characterized in that:

any of the positive and negative electrodes contains a current collector, any of whose surfaces is coated with an electrode layer and part of the opposite surfaces of adjacent positive and negative electrodes is further coated with a binder layer for binding the positive and negative electrodes with the polymeric separator membrane;

the binder layer is coated on the diagonals of the electrode surfaces.

5. The battery of claim 1, wherein the binder layer is formed by die coating.

6. The battery of claim 1, wherein the binder layer is formed by screen printing.

7. The battery of claim 1, wherein the positive and negative electrodes are bound with the polymeric separator under heat and pressure.

8. The battery of claim 1, wherein the material of the binder layer is selected from the groups consisting of rubber binder, sulfide compound, epoxy, polyester, ethylene-acetate polyvinyl, ethylene-acrylic polyester, polyethylene (PE), polypropylene (PP), acryl binder, cyanide acetate ester binder, aromatic polyamine binder, silicone binder, polyhenzimidazoles polyquinoxalines polyphenyl quinoxalines, and polyquinoline.

9. The battery of claim 4, wherein the binder layer is coated on the surface of the electrode layer.

10. The battery of claim 4, wherein the binder layer is coated on the two symmetric sides of the electrode layer.

11. The battery of claim 4, wherein the binder layer is formed by die coating.

12. The battery of claim 4, wherein the binder layer is formed by screen printing.

13. The battery of claim 1, wherein the positive and negative electrodes are bound with the polymeric separator under heat and pressure.

14. The battery of claim 4, wherein the material of the binder layer is selected from the group comprising rubber binder, sulfide compound, epoxy, polyester, ethylene-acetate polyvinyl, ethylene-acrylic polyester, polyethylene (PE), polypropylene (PP), styrene-isoproprene or styrene-butadiene copolymers, acryl binder, cyanide acetate ester binder, aromatic polyamine binder, silicone binder, polyhenzimidazoles polyquinoxalines polyphenyl quinoxalines, and polyquinoline.

* * * * *

UNITED STATES PATENT AND TRADEMARK OFFICE
CERTIFICATE OF CORRECTION

PATENT NO.    : 6,399,240 B1                                                Page 1 of 1
DATED         : June 4, 2002
INVENTOR(S)   : Yih-Song Jan et al.

It is certified that error appears in the above-identified patent and that said Letters Patent is hereby corrected as shown below:

<u>Title page,</u>
Item [12], United States Patent, change "Jan" to -- Jan, et al. --
Item [75], Inventor, add:
-- Chang-Rung YANG, Taichung (TW)
Jing-Pin PAN, Hsinchu (TW)
Wen-Bing CHU, Hsinchu (TW) --

Signed and Sealed this

Twenty-eighth Day of June, 2005

JON W. DUDAS
*Director of the United States Patent and Trademark Office*